May 10, 1955  F. K. KELEMEN ET AL  2,708,129
ARC WELDING STUD
Filed May 4, 1951

INVENTORS
Frank K. Kelemen
Rex A. Taylor
BY
Brown and Mikulka
ATTORNEYS

United States Patent Office 2,708,129
Patented May 10, 1955

2,708,129

ARC WELDING STUD

Frank K. Kelemen, Haddonfield, and Rex A. Taylor, Moorestown, N. J., assignors to KSM Products, Inc., Merchantville, N. J., a corporation of New Jersey Application May 4, 1951, Serial No. 224,548

14 Claims. (Cl. 287—20.2)

This invention relates to stud welding and more particularly to improved flux-filled arc welding studs.

The end welding of studs to a plate or other metallic body is performed semiautomatically by modern welding equipment, each weld requiring but a fraction of a second for its completion. The weld end of the stud which is flux-filled is brought into contact with the surface of the stud-receiving body or plate. Welding current is passed from the stud to the body and almost immediately thereafter the stud is lifted to strike the arc. The lift of the stud and the arcing period are automatically controlled, and at the completion of the arcing period the current is shut off and the stud end plunged into engagement with the stud-receiving body. Throughout this cycle of operations a ceramic arc shield surrounds the weld end of the stud and is maintained in continuous engagement with the surface of the stud-receiving body by the welding gun.

The electric arc created between the stud end and the stud-receiving body during the welding cycle generates heat of sufficient intensity to melt the parts adjoining the arc gap, producing a crater of molten metal in the body and melting a substantial portion of the end of the stud. One important function performed by the ceramic arc shield is to confine this molten mass at the site of the weld. The rapid and forcible plunging of the stud end into the crater of metal in the stud-receiving body, which follows the creation of the arc and which brings into contact the unmelted surfaces of the body and stud, displaces a substantial portion of the molten metal collected in the crater in the stud-receiving body. The arc shield forms this displaced molten metal into a fillet around the weld area. The total mass of the displaced molten metal which has to be handled by the arc shield in this manner is, roughly, equivalent to the sum of the mass of metal which is melted from the end of the stud and the mass of the metal of the body which is displaced from the crater in the body by the unmelted end of the stud as it penetrates into said crater. An excess of displaced metal at the base of the weld tends to lift the arc shield and to cause a splattering of the molten metal away from the weld area detracting materially from the uniformity, strength and appearance of the resulting weld. It is, therefore, of the utmost importance in the creation of uniform strong welds to effect a careful control of the mass of metal which is displaced during the welding operation, and it is equally important for efficient and rapid weld formation that the cross-sectional area of the arc gap to be maintained at a maximum throughout the operation.

It is accordingly one object of the present invention to provide a novel flux-filled stud so constructed at its "burn-off" length, i. e., the length of the weld end thereof which is melted down during the welding cycle, as to provide less mass of metal for melting during the welding operation without diminishing the area over which the arc is created, thereby producing fillets of improved uniformity and appearance and reducing the splatter during the welding operation to negligible proportions. The achievement of these objectives in solid flux-filled studs, i. e., studs wherein the fluxing material is a self-sustaining cohesive mass of ductile metal, assures the user of such studs of uniform and strong welds under widely varying welding conditions.

Another object is to provide a novel stud so constructed at its weld end as to give welds of improved quality and appearance, said improved welds being achieved with an appreciably lower power consumption than has heretofore been required for effecting welds with studs of the same diameter.

These and other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
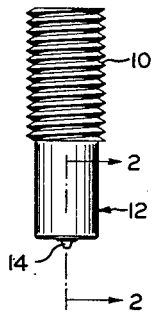
Figure 1 is an end elevation view of one type of flux-filled stud embodying the improved structure of the present invention.

Referring now to Figure 1 there is illustrated by way of example one type of flux-filled stud comprehended by the present invention which, as shown, comprises a shank 10 and a welding end 12, and is of the type having a solid flux charge or filling 14 formed, as shown, of a solid cohesive mass of ductile metal, e. g., aluminum or titanium. The latter is firmly secured in the stud end by having a portion of the mass thereof embedded in a suitable recess in said end and a preferred distribution and shape of this flux charge is described in detail in the copending application of Frank K. Kelemen, Serial No. 160,179, filed May 5, 1950 for "Flux-Filled Arc Welding Stud."

The shank 10 of the stud is shown as of standard threaded construction capable of suitably receiving a nut for bolting down flooring or the like. It is to be expressly understood, however, that the present invention is primarily concerned with the construction of the burn-off portion of the stud end proper and is not to be construed as being limited to any specific type of shank construction or any specific form of flux charge. The shank portion 10 of the stud may, for example, be an I bolt, a metal lath, a hook, a lagging, a stirrup or the like.

Figure 2:
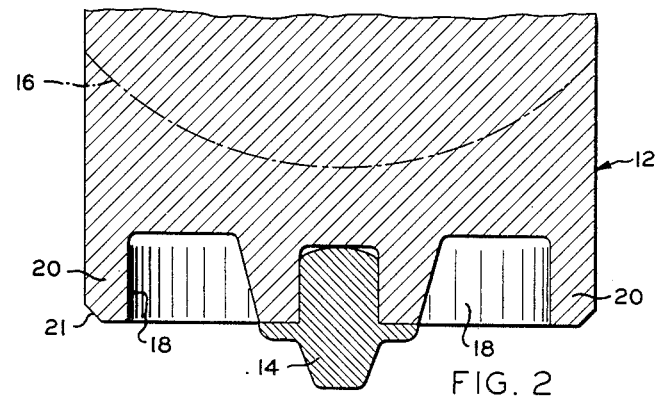
Fig. 2 is a cross-sectional view taken substantially along the line 2—2 of Fig. 1 and illustrating in detail the novel structure of the burn-off length of the stud of Fig. 1.

The invention is illustrated in greater detail in Fig. 2 in which the burn-off length of the stud is represented by that portion of the stud end below the broken line 16. Within this burn-off length there is provided a mass-diminishing indentation in the form of an annular groove 18 whose walls are symmetrically disposed in relation to the longitudinal axis of the stud and which is located between the outer edge of the stud end and the central flux-filled portion of the stud. This location of groove 18 leaves a skirt 20 of metal at the outer periphery of the stud end and it is this mass of metal which serves to establish the outer cross-sectional boundary of the arc created during the weld cycle. As a result, the cross-sectional area of the arc is essentially unaffected by the presence of the mass-diminishing indentation. Annular groove 18 is preferably machined by a simple cut taken parallel with the stud axis into the end of the stud and the mass of metal which is deleted from the unindented weld end constitutes an appreciable proportion of the mass of metal constituting the burn-off length of the unindented weld end.

The end of the stud may be provided with a conventional chamfer 21 which is of such size as to produce substantially no appreciable reduction in the cross-sectional area of the arc created during the welding cycle.

Figure 3:
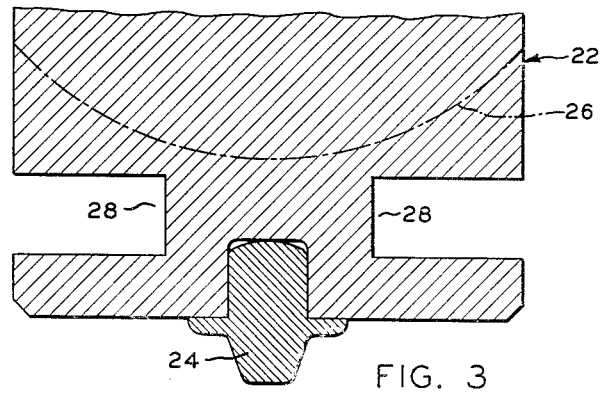
Figs. 3 and 4 are cross-sectional views similar to Fig. 2 of further modifications of stud end structures comprehended by the present invention.

Another form of the present invention is illustrated in Fig. 3 wherein there is shown the weld end 22 of a stud provided with a central solid flux charge 24 and having the upper boundary of its burn-off length represented by broken line 26. Weld end 22 has a mass-diminishing indentation 28 formed therein by a cut taken perpendicular to its longitudinal axis within its burn-off length, thereby forming a groove in the side wall of the stud which is spaced from the end of the stud. This again leaves at least a skirt of metal at the outer periphery of the stud end and assures the creation of a cross-sectional area approximately as large as the maximum cross-sectional area of the weld end 22 of the stud. As shown, groove 28 has parallel side walls perpendicular to the longitudinal axis of the stud and a bottom wall perpendicular to said side walls. This is a preferred shape for the groove although its side walls may be tapered with respect to one another or even curved, and the bottom wall may also be curved or at an angle other than 90° to the side walls.

Figure 4:
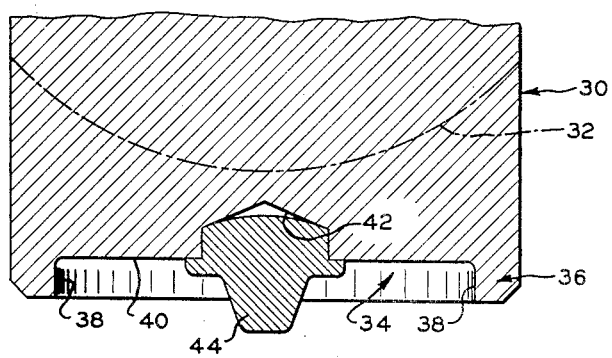

A still further embodiment of the present invention, which possesses certain advantages in the simplicity of the manufacturing operation involved in its fabrication and in the novel distribution of the fluxing agent which its modified structure makes possible, is illustrated in Fig. 4. As shown, the weld end 30 of the stud of this form of the invention is provided within its burn-off length, whose boundary is represented by line 32, with a mass-diminishing indentation 34 which, in effect, is a shallow bore in the stud end, said indentation being surrounded by a skirt 36 of the metal of the stud proper. Side walls 38 of said indentation are shown parallel with the longitudinal axis of the stud end but may be tapered in either direction. In the preferred form of the stud, the indentation 34 is concentric with the longitudinal axis of the stud. The base or bottom wall 40 of said indentation is provided with a further centrally located recess or bore 42 which serves to receive the solid flux charge 44. The mass of this flux charge is thus concentrated to a major extent below the end surface of the stud proper. However, the tip of said flux charge still projects beyond said end surface and is the portion of the stud which first engages the plate to which the stud is to be welded.

It is important that the reduction in the mass of the stud effected in the foregoing manner be confined to the burn-off length for to do otherwise would cause a diminution in the cross-sectional area of the solid parts at the weld producing a corresponding weakness in the weld. The simplicity of the machine operation which produces the mass-diminishing indentations 18, 28 and 34 is also significant since any mass-diminishing operation of a complex nature, regardless of its theoretical advantages, would make the cost per stud prohibitive and thus defeat its purpose.

There are thus provided novel electric arc studs whose burn-off length has substantially less mass melted during the welding operation as a result of the existence therein of a mass-diminishing indentation. The metal removed by the provision of this indentation has the effect of reducing the power requirements for making a satisfactory weld and also of reducing the amount of molten metal which must be controlled by the arc shield during the weld cycle. This minimizes splatter and improves the strength and the appearance of the resulting weld. The mass-diminishing indentation is preferably in the form of a groove or recess which is symmetrical with respect to the stud axis. It is confined entirely to the burn-off length of the stud end and yet is so located that there remains at the weld end of the stud a mass of the metal of the stud proper which extends to the very tip of the stud end and whose outer periphery circumscribes approximately the same area as the minimum cross-sectional area of the weld end of the stud proper. This assures the formation during the weld cycle of an arc of maximum cross-sectional area.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. An arc welding stud comprising a stud proper, including a burn-off length and a portion contiguous said burn-off length which remains solid during the weld cycle and forms the base of the weld, said burn-off length and said contiguous portion constituting the weld end of the stud proper, and a solid self-sustaining, cohesive flux charge mounted in said weld end, said burn-off length having a mass-diminishing indentation formed therein which is entirely confined thereto and having the mass of metal which forms its tip surface circumscribing, at its outer periphery, a cross-sectional area substantially equivalent to the maximum cross-sectional area of the weld end of the stud to provide for the striking of an arc over a cross-sectional area equivalent to said maximum cross-sectional area, a substantial volume of said indentation being free of metal.

2. An arc welding stud comprising a stud proper, including a burn-off length and a portion contiguous said burn-off length which remains solid during the weld cycle and forms the base of the weld, said burn-off length and said contiguous portion constituting the weld end of the stud proper, and a solid self-sustaining, cohesive flux charge mounted in said weld end, said burn-off length having a mass-diminishing indentation formed therein which is entirely confined thereto and having the mass of metal which provides the tip surface thereof located so that the outer periphery of said mass circumscribes approximately as great an area as the maximum transverse cross-sectional area of said weld end to provide for the striking of an arc over a cross-sectional area equivalent to said maximum transverse cross-sectional area, a substantial volume of said indentation being free of metal.

3. An arc welding stud comprising a stud proper, including a burn-off length and a portion contiguous said burn-off length which remains solid during the weld cycle and forms the base of said weld, said burn-off length and said contiguous portion constituting the weld end of the stud proper, and a solid self-sustaining, cohesive flux charge mounted in said weld end, said burn-off length having a mass-diminishing indentation formed therein which is entirely confined thereto and having the mass of metal which provides the tip surface thereof located so that the outer periphery of said mass circumscribes approximately as great an area as the maximum transverse cross-sectional area of said weld and to provide for the striking of an arc over a cross-sectional area equivalent to said maximum transverse cross-sectional area, said indentation providing an annular groove in said burn-off length which is free of metal.

4. An arc welding stud comprising the stud proper and a solid self-sustaining, cohesive flux charge mounted in the weld end thereof, said weld end having a mass-diminishing indentation formed entirely in the burn-off length thereof and comprising at least a peripheral skirt of metal whose end surface constitutes the welding tip of the stud proper and whose outer surface is essentially a continuous extension of the remainder of the weld end, a substantial volume of said indentation being free of metal.

5. The arc welding stud of claim 2 wherein said mass-diminishing indentation is symmetrically disposed with respect to the longitudinal axis of the weld end.

6. The arc welding stud of claim 2 wherein the mass-diminishing indentation is a continuous groove symmetrically disposed with respect to the longitudinal axis of said weld end.

7. The arc welding stud of claim 2 wherein the mass-diminishing indentation is a recess in the form of a shallow bore extending into the end of said weld end.

8. The arc welding stud of claim 2 wherein the mass-diminishing indentation extends into the side of said burn-off length in a direction generally perpendicular to the longitudinal axis of said weld end.

9. An arc welding stud comprising a stud proper, including a burn-off length and a portion contiguous to said burn-off length which remains solid during the weld cycle and forms the base of the weld, said burn-off length and said contiguous portion constituting the weld end of the stud, said weld end having a shallow bore formed in the end of the burn-off length thereof, and a solid self-sustaining, cohesive flux charge mounted within a recess formed in the base of said bore, said bore being surrounded by an annular skirt whose end surface provides the welding tip of the stud proper, the portion of said indentation between said skirt and said flux charge being free of metal.

10. An arc welding stud comprising a stud proper, including a burn-off length and a portion contiguous to said burn-off length which remains solid during the weld cycle and forms the base of the weld, said burn-off length and said contiguous portion constituting the weld end of the stud, said weld end having a shallow bore formed in the end of the burn-off length thereof, and a solid self-sustaining, cohesive flux charge mounted within a recess formed in the base of said bore, said flux charge being centrally located with respect to said bore and said bore being surrounded by an annular skirt whose end surface provides the welding tip of the stud proper, said solid flux charge having the tip thereof projecting beyond the end surface of said skirt, the portion of said indentation between said skirt and said flux charge being free of metal.

11. An arc welding stud comprising a stud proper, including a burn-off length and a portion contiguous to said burn-off length which remains solid during the weld cycle and forms the base of the weld, said burn-off length and said contiguous portion constituting the weld end of the stud, said weld end having a shallow bore formed in the end of the burn-off length thereof, and a solid self-sustaining, cohesive flux charge mounted within a recess formed in the base of said bore, said flux charge being centrally located with respect to said bore and said bore being surrounded by an annular skirt whose end surface provides the welding tip of the stud proper, said solid flux charge having the tip thereof projecting beyond the end surface of said skirt, the outer periphery of said skirt circumscribing approximately as great an area as the maximum transverse cross-sectional area of said weld end, the portion of said indentation between said skirt and said flux charge being free of metal.

12. An arc welding stud comprising a stud proper, including a burn-off length and a portion contiguous to said burn-off length which remains solid during the weld cycle and forms the base of the weld, said burn-off length having an annular groove formed in the end thereof, the outer wall of said groove being formed by a peripheral skirt which extends to the outer periphery of said weld end and the inner wall of said groove being formed by a central core of metal, and a solid self-sustaining, cohesive flux charge mounted in a recess in said central core, said annular groove being free of metal.

13. The arc welding stud of claim 12 wherein the annular groove formed in the end thereof is symmetrical with respect to the longitudinal aixs of said stud.

14. The arc welding stud of claim 13 wherein the solid flux charge is substantially symmetrical with respect to the longitudinal axis of said stud.

References Cited in the file of this patent

UNITED STATES PATENTS

| | | |
|---|---|---|
| 1,004,795 | Lachman | Oct. 3, 1911 |
| 2,054,187 | Almdale | Sept. 15, 1936 |
| 2,315,502 | Crecca et al. | Apr. 6, 1943 |
| 2,402,659 | Nelson | June 25, 1946 |
| 2,413,370 | Palmer | Dec. 31, 1946 |
| 2,441,257 | Candy | May 11, 1948 |